US006674574B1

United States Patent
Aono

(10) Patent No.: US 6,674,574 B1
(45) Date of Patent: Jan. 6, 2004

(54) FOCUSING SYSTEM FOR A MICROSCOPE AND A REFLECTED ILLUMINATION FLUORESCENCE MICROSCOPE USING THE FOCUSING SYSTEM

(75) Inventor: Yasushi Aono, Yokohama (JP)

(73) Assignee: Olympus Corporation, Tokyo (JP)

( * ) Notice: Subject to any disclaimer, the term of this patent is extended or adjusted under 35 U.S.C. 154(b) by 546 days.

(21) Appl. No.: 09/667,691

(22) Filed: Sep. 22, 2000

(30) Foreign Application Priority Data

Sep. 24, 1999 (JP) .......................................... 11-270297

(51) Int. Cl.[7] .............................................. G02B 21/00
(52) U.S. Cl. ...................... 359/383; 359/371; 250/201.3
(58) Field of Search ................................ 359/368, 370, 359/371, 382, 383, 391, 392, 385, 381; 250/201.3

(56) References Cited

U.S. PATENT DOCUMENTS 5,122,648 A * 6/1992 Cohen et al. ............ 250/201.3
5,856,665 A * 1/1999 Price et al. ................. 250/205
5,932,872 A * 8/1999 Price ........................ 250/201.3
6,052,223 A    4/2000 Yoneyama ................. 359/381

FOREIGN PATENT DOCUMENTS

JP    0917034 A  *  7/1997  .......... G02B/21/16
JP    9189849       7/1997

* cited by examiner

*Primary Examiner*—Mark A. Robinson
*Assistant Examiner*—Lee Fineman
(74) *Attorney, Agent, or Firm*—Kenyon & Kenyon

(57) ABSTRACT

A focusing system for a microscope has an objective lens, a sample stage, a reflected illumination system for generating fluorescence from a sample, a transmitted illumination system for irradiating light on the sample to capture a transmitted optical image, a set of optical elements for forming the transmitted optical image on the basis of a phase information included in light transmitted through the sample, an optical element for dividing the fluorescence image and the transmitted optical image, a sensor for capturing the transmitted optical image divided by the optical element for dividing light, a focus detecting section for detecting a focusing level of the transmitted optical image on the basis of a signal output from the sensor, and a driver for moving at least one of the objective lens and the stage to focus on the sample on the basis of the focusing level.

7 Claims, 16 Drawing Sheets

US 6,674,574 B1

FOCUSING SYSTEM FOR A MICROSCOPE AND A REFLECTED ILLUMINATION FLUORESCENCE MICROSCOPE USING THE FOCUSING SYSTEM

CROSS REFERENCE TO RELATED APPLICATION

This application is based on and claims priority of Japanese Patent Application No. Hei 11-270297 filed on Sep. 24, 1999, the content of which is incorporated herein by reference.

BACKGROUND OF THE INVENTION

1. Field of the Invention

The present invention relates to a focusing system for a microscope in general and especially relates to a focusing system for an incident-light fluorescence microscope.

2. Description of the Related Art

Traditionally, in the field of microscopy, in which a microscope observes an optical image of a sample transmitted through an objective lens on a video monitor, and takes a picture of the optical image, an auto focusing system to detect a focal point of the objective lens, and to adjust the focal point to an image plane of a TV camera and a camera film is one of most important elements present.

Recently, an incident-light fluorescence microscopes to observe fluorescent light radiated from a sample, for example, biopsy tissue and biological cells, dyed by a fluorescent reagent by exciting the fluorescent reagent have become popular. Now, auto focusing systems are expected to operate with the incident-light fluorescence microscope.

An auto focusing system used in substantially this kind of fluorescence observation is disclosed in Japanese Laid-Open Patent Publication No. Hei 9-189849. Japanese Laid-Open Patent Publication No. Hei 9-189849 teaches a method to correct a focal shift on the basis of chromatic aberration coming from each imaging optical system of a photo system and a focusing system by using a wavelength of fluorescence.

However, the conventional auto focusing system for the incident-light fluorescence microscope has a problem in that the amount of light of an observed fluorescent wavelength is so small, that it is necessary to spend more time storing incident light until the amount of incident light is adapted to a range of a photo acceptance unit used to detect a focal point. That is, the problem is that the processing time for an automatic focus is overlong.

The above problem causes low efficiency of observation. Furthermore, excitation light from the upper side of the sample is continuously irradiated on the sample during an automatic focus operation, so that the sample is forced to needlessly be subjected to fluorescence photo-bleaching leading to discoloration. Discoloration causes a fatal problem in fluorescence observation.

BRIEF SUMMARY OF THE INVENTION

The present invention provides a focusing system for a microscope and a reflected illumination fluorescence microscope using the focusing system which overcome these problems. It has an objective lens, a sample stage, a reflected illumination system for generating fluorescence from a sample, a transmitted illumination system for irradiating light on the sample to capture a transmitted optical image, a set of optical elements for forming the transmitted optical image on the basis of phase information included in light transmitted through the sample, an optical element for dividing the fluorescence image and the transmitted optical image, a sensor for capturing the transmitted optical image divided by the optical element for dividing light, a focus detecting section for detecting a focusing level of the transmitted optical image on the basis of a signal output from the sensor, and a driver for moving at least one of the objective lens and the stage to focus on the sample on the basis of the focusing level.

BRIEF DESCRIPTION OF THE DRAWINGS

The accompanying drawings, which are incorporated in and constitute a part of the specification, illustrate exemplary embodiments of the invention, and together with the general description above and the detailed description of illustrative embodiments given below, serve to explain the principles of the invention.

DETAILED DESCRIPTION

First Illustrative Embodiment

Figure 1:
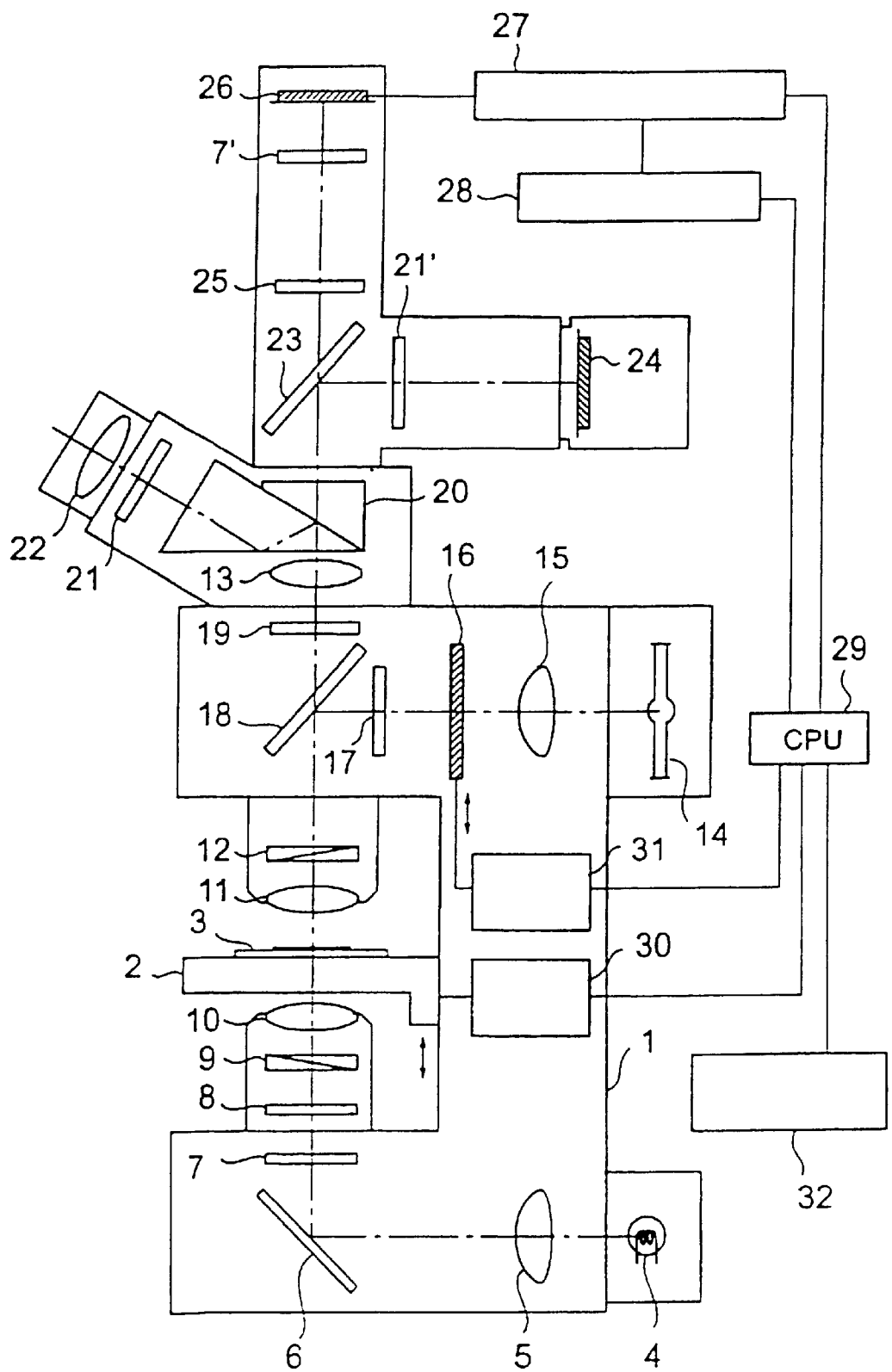
FIG. 1 is a block diagram of the focusing system for the microscope according to a first embodiment of the invention.

FIG. 1 shows a structure of a first embodiment of this invention. The first embodiment, a microscope, basically comprises components as follows:

a reflected illumination fluorescence observation means including, for example, a light source 14, a collector lens 15, an excitation filter 17, a dichroic mirror 18, an absorption filter 19, and an objective lens 11, for irradiating excitation light having a specific wavelength on a sample 3 through the objective lens 11, and for collecting fluorescence which has a specific wavelength longer than that of the excitation light;

a transmitted illumination optical system including, for example, a light source 4, a collector lens 5, and a condenser lens 10, for illuminating the sample 3 from the opposite side of the objective lens 11;

a specific wavelength transmitting means including a filter, for example, a band-pass filter 7, having a spectral transmission characteristic to transmit a specific wavelength of light which is longer than that of fluorescence in the transmitted illumination optical system;

wavelength dividing means including a mirror, for example, a dichroic mirror, having a spectral transmission characteristic to transmit one of fluorescence and light transmitted through the specific wavelength transmitting means, and reflect the other;

imaging means, for example, a TV camera or an imaging screen, disposed on the side of a shorter wavelength of light divided by the wavelength dividing means, for imaging an optical image of the sample 3;

light receiving means, for example, a imaging sensor 26, disposed on the side of a long wavelength of light divided by the wavelength dividing means, for receiving an optical image of the sample 3, and for storing the optical image until the amount of received light reaches a specific range;

focus detecting means, for example, an analog signal processing circuit 27, for detecting a condition of focusing on the sample 3 on the basis of an evaluation value of a focusing level corresponding to an output signal of the light receiving means;

servo means including a CPU 29 and a stage moving mechanism, for moving the sample 3 on the basis of the focusing level of the focus detecting means to search for a position where the sample 3 is in focus; and control means including a CPU 29, for controlling the light receiving means, the focus detecting means, and the servo means.

Following is a more detailed explanation of the above structure of the first embodiment. In FIG. 1, a body 1 of the microscope has a stage 2. The sample 3 is put on the stage 2. The stage enables movement of the sample 3 in a direction parallel with an axis of the objective lens 11.

An illuminating optical system for a transmitted differential interference microscope is formed below the stage 2. More specifically, light emitted from the light source 4 passes through the collector lens 5, and is reflected by a total reflection mirror 6. Then only a specific wavelength of light reflected by the total reflection mirror 6 is transmitted by the band-pass filter 7, and is directed to a polarizer 8. The spectral transmission characteristic of the band-pass filter 7 will be explained after.

Linearly polarized light transmitted through the polarizer 8 is divided into two linearly polarized light rays which vibrate in orthogonal directions by means of a Wollaston prism (birefringence element) 9 acting as a differential interference prism. These two linearly polarized light rays are condensed by a condenser lens 10, and transmitted through the sample 3 with a shear (lateral shift).

These two linearly polarized light rays are transmitted through the objective lens 11, and interfere with each other by means of a second Wollaston prism 12 and an analyzer 25 to be explained later. The interference image created by these two wave surfaces is observed through an image forming lens 13 as bright-dark fringes or the contrast of colors obtained by differentiating the phase change of light transmitted through the sample 3.

An illuminating optical system for reflected illumination fluorescence observation is formed above the stage 2. That is to say, light emitted from the light source 14 passes through the collector lens 15 when a shutter 16 is opened. Then only a wavelength of light which will excite the sample 3 is transmitted through the excitation filter 17, and is reflected by the dichroic mirror 18. Light reflected by the dichroic mirror 18 passes through the second Wollaston prism 12, and is directed to the sample by means of the objective lens 11.

As explained above, a portion of the sample 3 dyed with a fluorescent dye is excited to emit fluorescence with a wavelength longer than that of the excitation light. This fluorescence is collected by the objective lens 11, and is transmitted through the second Wollaston prism 12 and the dichroic mirror 18. The fluorescence transmitted through the dichroic mirror 18 is transmitted through the absorption filter 19 which transmits only fluorescence having a wavelength longer than a specified wavelength region. The fluorescence transmitted through the absorption filter 19 is observed through the image forming lens 13 as a fluorescent image. Now, the spectral transmittance characteristics of the excitation filter 17, dichroic mirror 18, and the absorption filter 19 are the same as those of a conventional incident-light fluorescence microscope as explained below.

Furthermore, an observation optical system to directly observe the sample 3, an imaging optical system to image the sample 3 by using a TV camera and photographic film, and a focus detecting optical system to detect a focusing level of the objective lens 11 for the sample 3 is formed on the illuminating optical system for incident-light fluorescence observation.

Specifically, light reflected by an optical path dividing prism 20, after passing through the image forming lens 13, is observed through a low-pass filter 21 and an ocular lens 22, each of which has spectral transmittance characteristics as explained below.

A wavelength of light shorter than a specified wavelength region of light, in light transmitted through the optical path dividing prism 20, after passing through the image forming lens 13 is reflected by a second dichroic mirror 23 which has a spectral transmittance characteristic as explained below. A wavelength longer than the above specified wavelength region of light is transmitted by the second dichroic mirror 23. Light reflected by the second dichroic mirror 23 is focused on the image plane 24 of the TV camera and the photographic film, which are disposed at a focal position of the image forming lens 13, through a low-pass filter 21'. The low-pass filter 21' has substantially the same spectral transmittance characteristic as the low-pass filter 21.

On the other hand, light transmitted through the second dichroic mirror 23 is focused on the image sensor 26, which is disposed at an optically conjugate plane of the image plane 24, through the analyzer 25 and the band-pass filter 7'. The band-pass filter 7' has substantially the same spectral transmittance characteristic as the band-pass pass filter 7.

Figure 2:
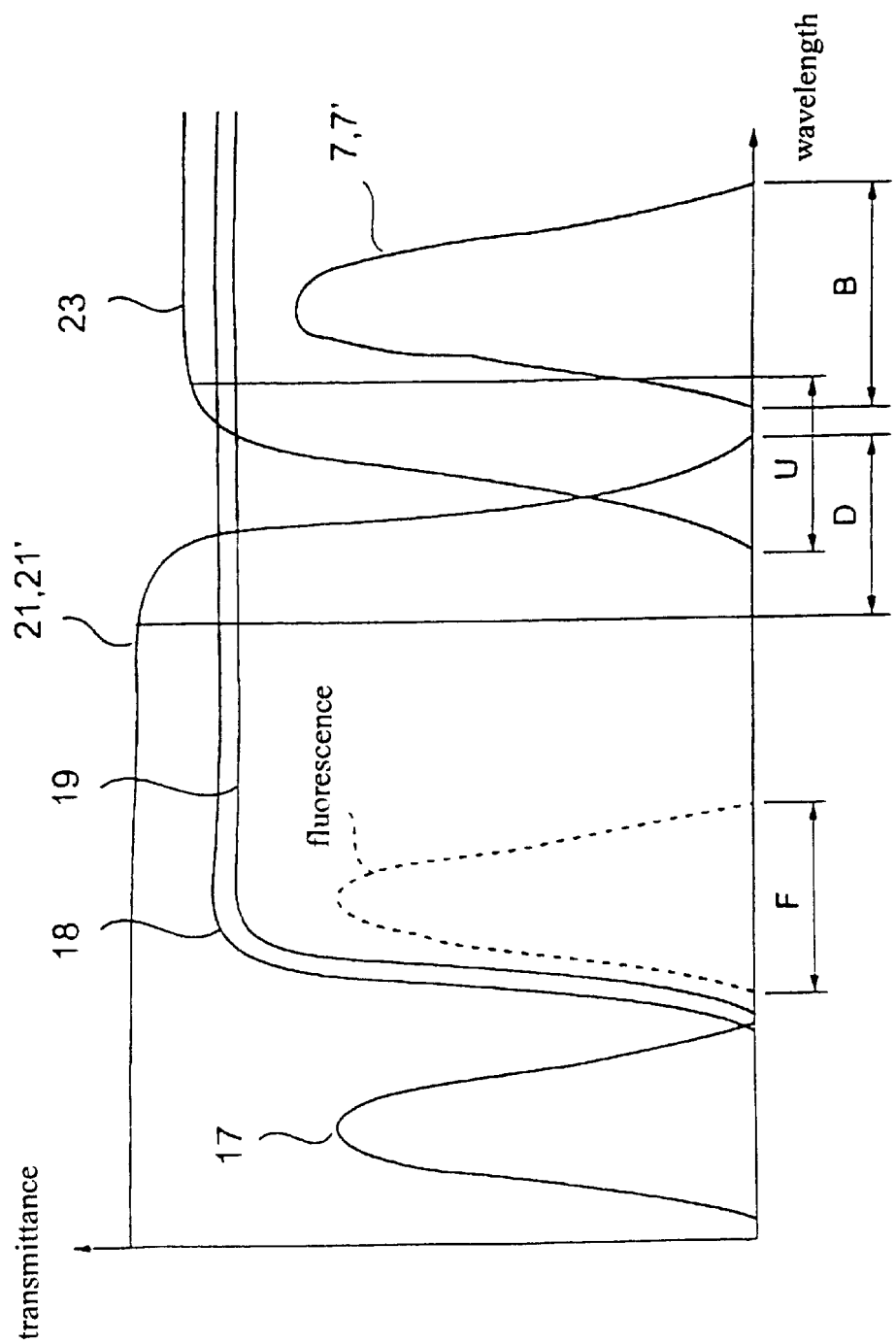
FIG. 2 is a graph showing the spectral transmittance characteristics to explain the action and advantage of the first embodiment.

FIG. 2 is a graph showing the spectral transmittance characteristics of the band-pass filter 7, the excitation filter 17, the dichroic mirror 18, the absorption filter 19, the low-pass filter 21, the second dichroic mirror 23, the low-pass filter 21', and the band-pass filter 7'.

As explained above, the spectral transmittance characteristics of the excitation filter 17, the dichroic mirror 18, and the absorption filter 19 are the same as those of a conventional incident-light fluorescence microscope.

As shown in FIG. 2, a wavelength region U in which the spectral transmittance of the second dichroic mirror 23 rises is at a longer wavelength and does not overlap with a fluorescent wavelength region F excited by the excitation light transmitted through the excitation filter 17. Furthermore, the wavelength region U is at a shorter wavelength than peaks of the spectral transmittance characteristics of the band-pass filters 7 and 7'.

A wavelength region D in which each of the spectral transmittance of the low-pass filters 21 and 21' falls is at a longer wavelength as compared to a peak of an intensity distribution of a fluorescent wavelength excited by the excitation light transmitted through the excitation filter 17. Furthermore, the wavelength region D is at a shorter wavelength which does not overlap with a transmission wavelength region B of the band-pass filters 7 and 7'. In other words, transmitted differential interference light of only the wavelength region B is transmitted through the sample 3, the objective lens 11, the dichroic mirror 18, absorption filter 19, the second dichroic mirror 23, and the band-pass filter 7', and then, directed to the imaging sensor 26.

At this point, light reflected a little by the second dichroic mirror is filtered out by the low-pass filter 21', so that the light is not directed to the image plane 24. Fluorescence excited by reflected illumination light is transmitted through the dichroic mirror 18 and absorption filter 19, reflected by the second dichroic mirror 23, transmitted through the low-pass filter 21', and then, directed to the image plane 24. Therefore a transmitted differential interference image is directed on one side to the focus detecting optical system, and a fluorescent image is directed on another side to the imaging optical system, that is, the transmitted differential interference image and the fluorescent image are separated entirely.

Transmitted differential interference light including light directed to the observation optical system is filtered by the low-pass filter 21. Therefore only fluorescence is directed to the ocular lens 22.

Next, with regard to the first embodiment, the connection of electric signals and a process will be explained by using FIG. 1.

The imaging sensor 26 is set to output an analog signal corresponding to a voltage which depends on the amount of incident light and the storage time of an optical image projected on the imaging sensor 26.

The imaging sensor 26 is connected to the analog signal processing circuit 27. The analog signal processing circuit 27 is connected to a performance function operating unit 28 and the CPU 29. The analog signal processing circuit 27 amplifies an analog signal from the imaging sensor 26, and carries out a filtering process, an analog process, and so on.

Furthermore, an analog signal processed by the analog signal processing circuit is input into the performance function operating unit 28. The performance function operating unit 28 detects a defocusing level, which shows the focusing level of the sample 3, on the basis of a certain performance function. The defocusing signal is transmitted to the CPU 29.

The CPU 29 controls the analog signal output by the imaging sensor 26 to adapt to the range of the analog signal processing circuit 27, and transmits signals to a stage driver to focus on the sample 3 on the basis of the defocusing signal from the performance function operating unit 28. The stage driver 30, acting as an actuator moves the stage 2. The signals transmitted to the stage driver 30 include the amount of movement of the stage 2 and direction to move the stage 2. The stage driver can be operatively coupled to the objective lens 11, that is, the stage driver 31 can move at least one of the objective lens 11 and the stage 2 to focus on the sample.

The stage driver 30 moves the stage 2 in up and down directions on the basis of the above signals from the CPU 29 so as to focus on the sample 3. The CPU 29 transmits an open-close signal of the shutter 16 to a shutter driver 31. The shutter driver 31 opens and closes the shutter 16 on the basis of the open-close signal from the CPU 29. These operations are carried out by means of a control starting switch of an outer controller 32 connected to the CPU 29.

Figure 3:
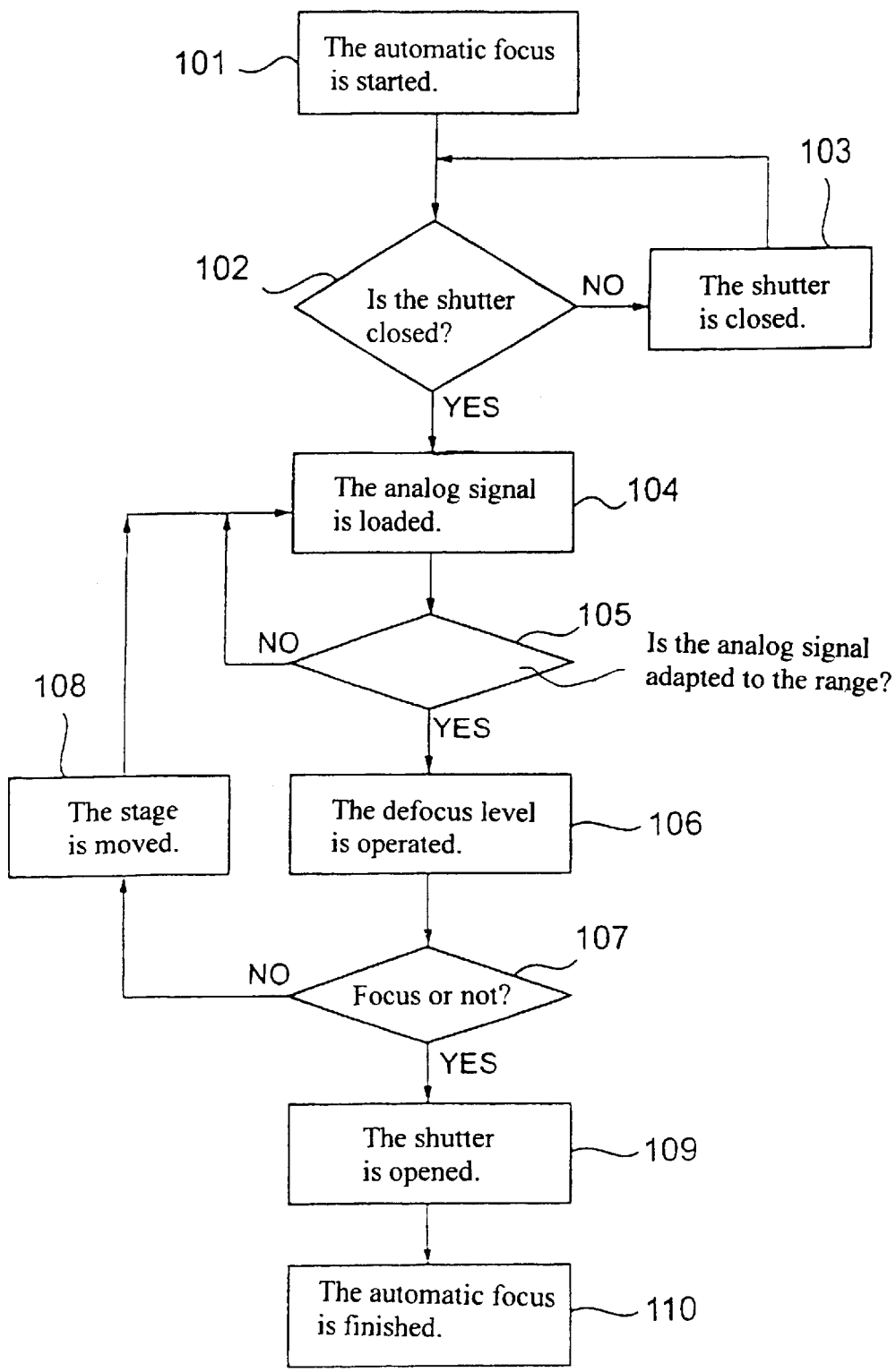
FIG. 3 is a flowchart to explain the operation of the block diagram shown in FIG. 1.

Next, referring to flowchart of FIG. 3, an operation of the first embodiment as structured above will be explained. First of all, in step 101, an automatic focus operation is started according to a signal from the outer controller 32, and then, in step 102, an open-close condition of the shutter 16 is checked. In the case where 20 the shutter 16 is opened, in step 103, a signal is transmitted to the shutter driver 31 to close the shutter 16. In the case where the shutter 16 is closed, in step 104, an analog picture signal, on the basis of the transmitted differential interference image captured by the imaging sensor 26, is loaded. Then, in step 105, the analog signal from the imaging sensor 26 is checked to see whether the analog signal is adapted to the range of the analog signal processing circuit 27 or not.

At this point, in the case where the analog signal is not adapted to the range, the storage time is controlled until the analog signal reaches to the range. In the case where the analog signal is adapted to the range, in step 106, the defocusing level, which shows the focusing level of the sample 3, is operated on the basis of the analog signal from the imaging sensor 26 and a certain performance function. Then, in step 107, a focusing decision is carried out on the basis of the defocusing level. In the case where the sample 3 is not in focus, in step 108, the signals of the amount of movement of the stage 2 and directions to move the stage 2 corresponding to the defocusing level, are transmitted to the stage driver 30. Then a series of operations from step 104 to step 108 is repeated until the sample 3 is in focus. After the sample 3 is in focus, in step 109, a signal to open the shutter 16 is transmitted to the shutter driver 31, and then, in a step 110, the operation is finished.

The following are advantages of the first embodiment. The automatic focus operation to take a fluorescent image by using the TV camera and photographic film which are disposed at the image plane 24, is carried out on the basis of a sample image which is projected to the imaging sensor 26 and formed by a transmitted differential interference observation. The amount of light incident on the imaging sensor 26 can be relatively increased by increasing the amount of light emitted from the light source 4, so that the storage time to store light at the imaging sensor 26 to adapt the amount of light to the range of the analog signal processing circuit 27 is shortened. Therefore, in a fluorescence observation with a small amount of light, the total time to obtain automatic focus is shortened.

Fluorescence emitted from the sample 11 is collected by the objective lens. The fluorescence is not directed to the side of the focus detecting optical system, so that the fluorescence is directed to the side of the imaging optical system with high efficiency.

Additionally, the analyzer 25 for the transmitted differential interference observation is disposed on the side of the imaging sensor 26 closer than the second dichroic mirror 23, and is not in an optical path of the fluorescence observation, so that the amount of light is not reduced by transmitting through the analyzer 25.

Furthermore, a little light, which is reflected by the second dichroic mirror 23, of the transmitted differential interference observation is prevented from getting into the image plane 24 by means of the low-pass filter 21'. Therefore, this embodiment enables taking a fluorescence image with high efficiency because of little loss of fluorescence light, and high contrast in the fluorescence image. Likewise, with regard to the observation optical system on the side of the ocular lens 22, the light of the transmitted differential interference observation is intercepted by means of the low-pass filter 21, so that this embodiment enables taking a fluorescence image with high efficiency because of little loss of fluorescence light, and high contrast in the fluorescence image. Additionally, this embodiment is constructed safety in order not to directly see near infrared light with the eyes even if the transmission wavelength region B is set in a near infrared region.

In addition, since the shutter 16 is closed during the automatic focus operation, excitation light is not irradiated on the sample 3. Therefore, this embodiment enables avoiding needless fluorescence photo-bleaching.

As explained above, the focusing system for the microscope of this embodiment enables a reduction in time for the automatic focus, and secures utmost efficiency of fluorescence observation.

(A Modification of the First Illustrative Embodiment)

Figure 4:
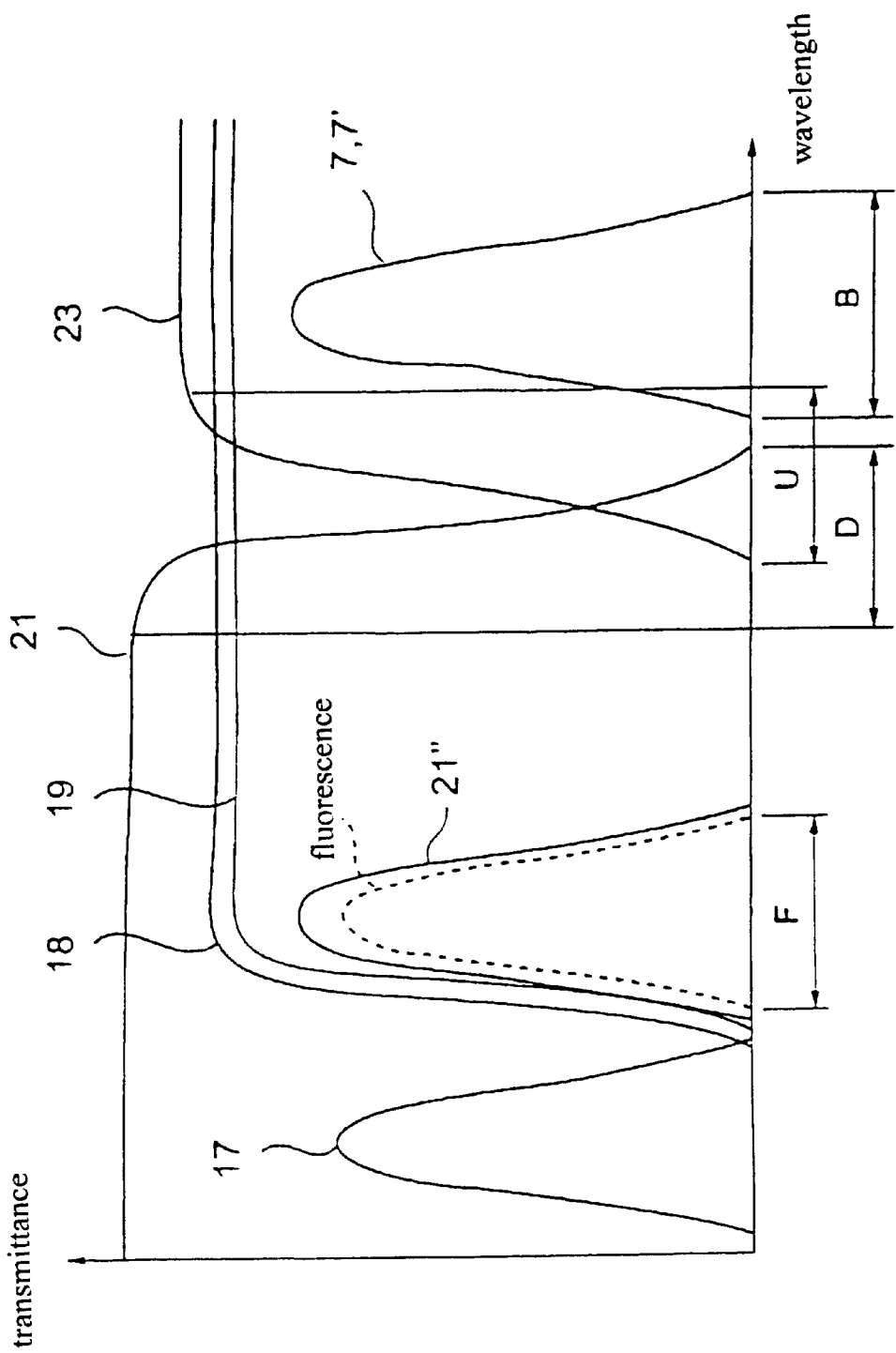
FIG. 4 is a graph showing the spectral transmittance characteristics to explain a modification of the first embodiment.

Although the stage 2 is moved in an up and down direction so as to focus on the sample 3 in the first illustrative embodiment explained above, it is possible to use a microscope which moves the objective lens 11 instead of the stage 2. Advantages obtained by using this modified embodiment are the same as those of the above first illustrative embodiment. In addition, it is possible to use a low-pass filter 21". FIG. 4 is a graph showing the spectral transmittance characteristics of this modification of the first embodiment. It has substantially the same spectral transmittance characteristic as an intensity distribution shown in FIG. 4, instead of the low-pass filter 21'. Advantages of using the low-pass filter 21" are the same as in the above first illustrative embodiment.

In the first illustrative embodiment explained above, it is possible to use an optical member in the observation optical system instead of the low-pass filter 21. The optical member, for example, the ocular lens and so on, is given a near infrared reflecting coat. Advantages of using such an optical member are the same as in the above first illustrative embodiment.

Figure 5:
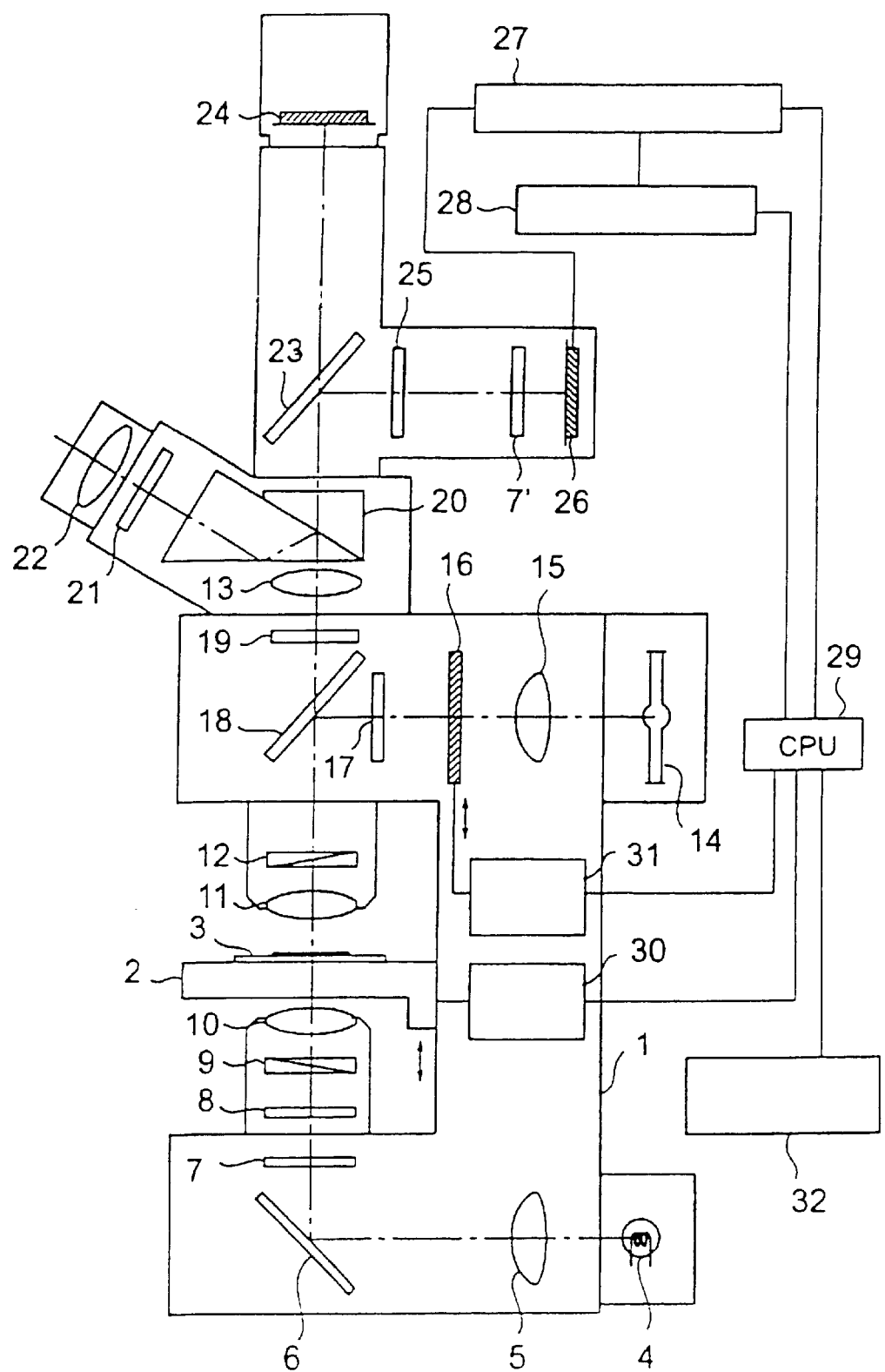
FIG. 5 is a block diagram to explain a modification of the first embodiment of the invention.

In the first illustrative embodiment explained above, it is possible to move the imaging optical system to the side of a transmitted illumination area of the second dichroic mirror 23 as shown in FIG. 5.

Figure 6:
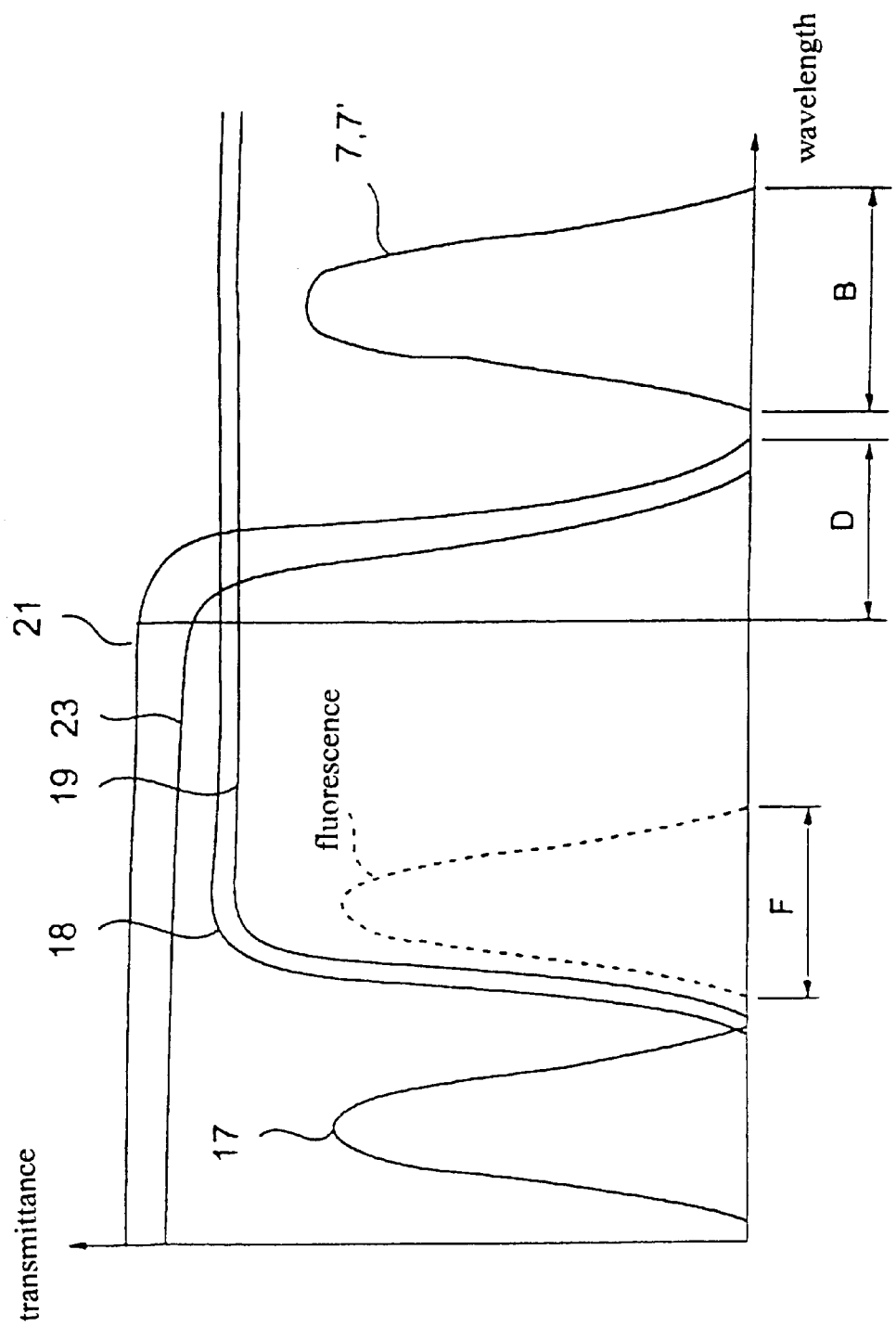
FIG. 6 is a graph showing the spectral transmittance characteristics to explain the action and advantage of the modification of the first embodiment.

The components in FIG. 5 that are the same as those in FIG. 1 are given the same reference numbers. The spectral transmittance characteristic of the second dichroic mirror 23 shown in FIG. 5 is set to transmit a shorter wavelength region of light than a specified wavelength region of light, and reflect a longer wavelength region of light than the shorter wavelength region as shown in FIG. 6 so as to have the same advantages as the first illustrative embodiment.

The spectral transmittance characteristics of the band-pass filter 7, the excitation filter 17, dichroic filter 18, absorption filter 19, and band-pass filter 7' are the same as those described in FIG. 1. In this case, the light of the transmitted differential interference observation is intercepted by means of the second dichroic mirror 23, so that the low-pass filter 21' is unnecessary.

Second Illustrative Embodiment

Figure 7:
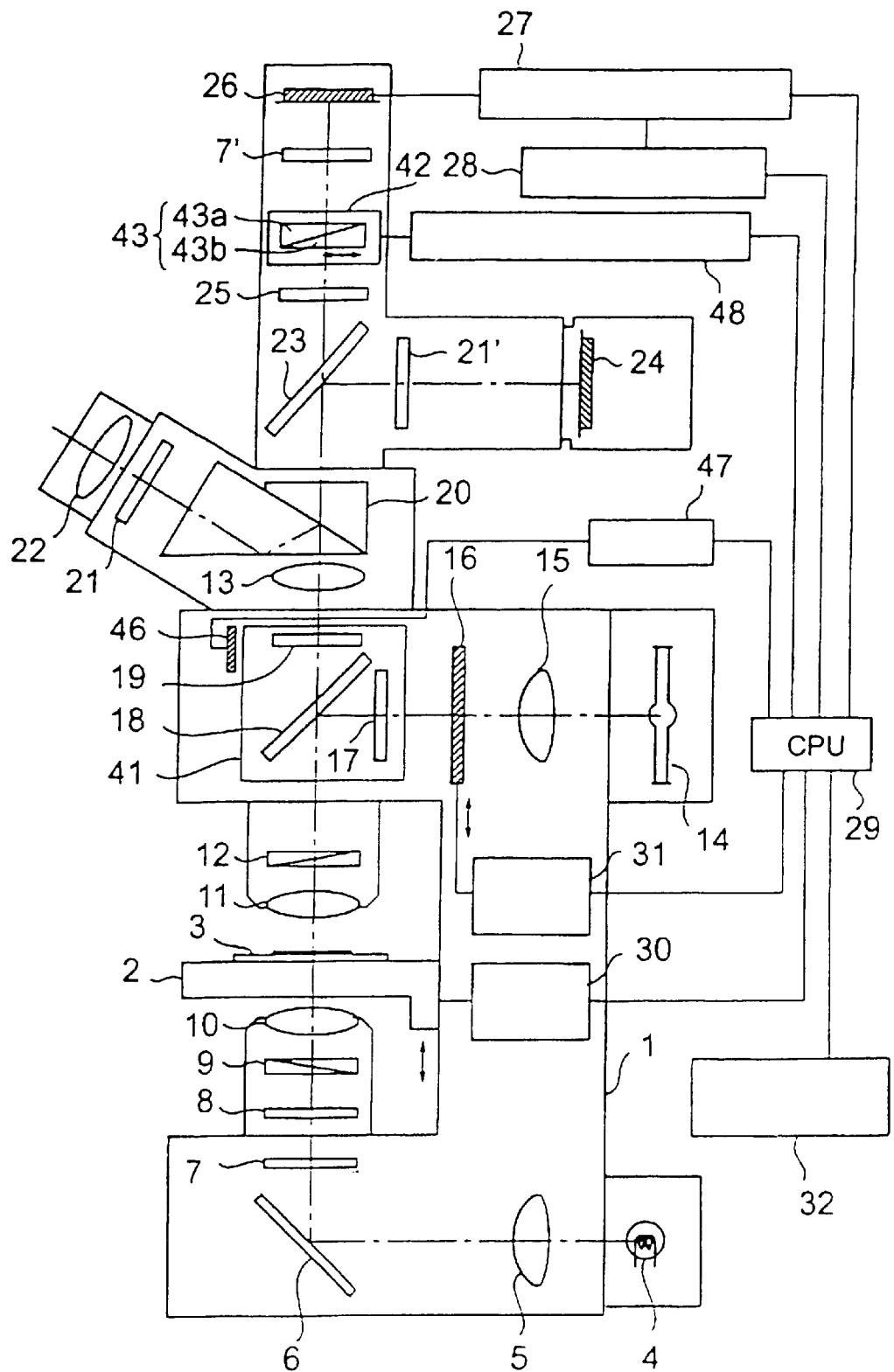
FIG. 7 is a block diagram of the focusing system for the microscope according to a second embodiment of the invention.

FIG. 7 shows a structure of a second embodiment of the present invention. The components in FIG. 7 that are the same as those in FIG. 1 are given the same reference numbers and their description is omitted. In FIG. 7, each of cube cassettes 41a, 41b and 41c as an optical element unit has the excitation filter 17, the dichroic mirror 18, and the absorption filter 19. As explained below, a plurality of cube cassettes 41a, 41b and 41c are provided. Each of cube cassettes 41a, 41b and 41c has a different spectral transmittance characteristic based on different kinds of excitation filters 17, dichroic mirrors 18, and absorption filters 19. One of these cube cassettes is selectively inserted as cube cassette 41 into an axis of the objective lens 11 so as to switch a wavelength of reflected illumination fluorescence light.

An optical path correcting unit 42 is set in the focus detecting optical system which is disposed on the side of the imaging sensor 26. The optical path correcting unit 42 enables moving a parallel prism 43 parallel to the directions of the arrows shown in FIG. 7. The parallel prism 43 is formed by stacking a wedge prism 43a on a wedge prism 43b. Each of the wedge prisms 43a and 43b is made from different materials. A focal point of light transmitted through the parallel prism 43 can be changed on the basis of the proportion of the thickness of the wedge prism 43a to that of the wedge prism 43b. The parallel prism 43 explained above is disclosed in Japanese Laid-Open Patent Publication No. Hei 9-189849.

Figure 8:
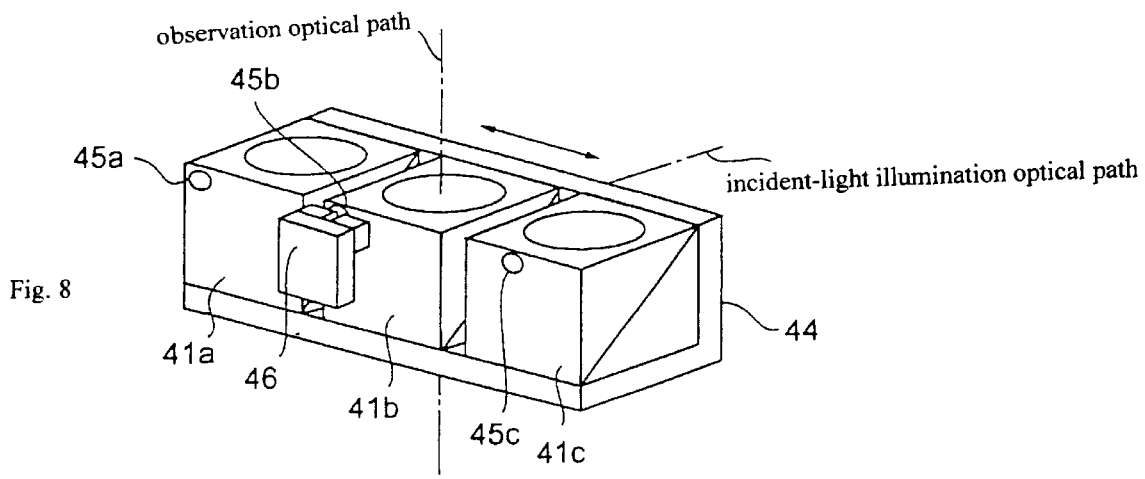
FIG. 8 is an oblique perspective figure to explain a cube cassette 41 shown in FIG. 7.
Figure 9:
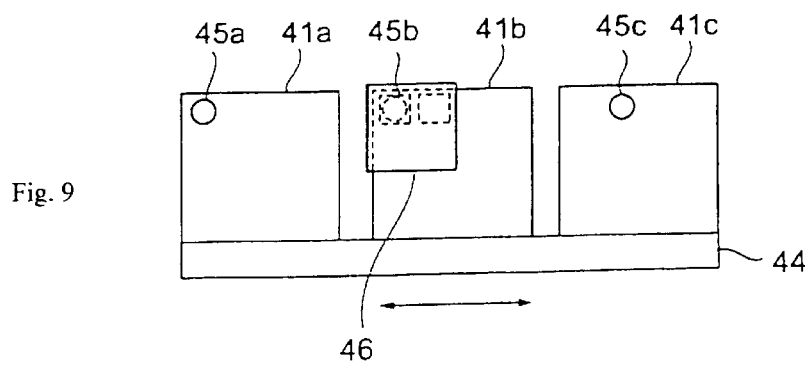
FIG. 9 is a conceptual diagram of a physical relationship corresponding to a distinguishing sensor 46.

FIG. 8 shows an enlarged drawing of a switching part for the cube cassettes 41a, 41b and 41c (hereinafter called the cube cassette 41). In FIG. 8, each of the cube cassettes 41 is set on a holder 44 which is placed so as to slide parallel to the directions of the arrows shown in FIG. 8. That is, although the cube cassette 41b may be inserted in the axis in FIG. 8, it is possible to insert either the cube cassette 41a or 41c into the axis by moving the holder 44 parallel to the directions of the arrows. At this point, the holder 44 forms a part of a slider as shown in FIGS. 8 and 9. In addition, a turret(not shown) can also be used instead of the slider. For example, the turret may comprise a rotating table that has the cube cassettes 41 thereon. The slider and the turret are kinds of changers.

Each of the cube cassettes 41a–c has some different characteristics, for example, each have transmission/reflection characteristics which are different. Each of these different characteristics should be recognized because these differences make a focal shift of light incident on the image plane 24. The focal shift is caused by changing one cube cassette for another, that is, the focal shift depends on the kind of excitation filter, the kind of first dichroic mirror, and kind of absorption filter. So each of the cube cassettes 41 has a flag 45a, 45b, or 45c to distinguish which kind of cube cassette is being inserted in the axis. Each of flags 45a, 45b, and 45c has information concerning the focal shift of light incident on the image plane 24. A distinguishing sensor 46, which distinguishes what kind of cube cassette kind is inserted in the axis on the basis of the flag kind, is placed on the opposite side of the flag. This can be seen adjacent the flag 45b of the cube cassette inserted in an optical path directed to the sample 3 shown in FIG. 8. The distinguishing sensor 46 is connected to the microscope body 1, and is set close to the flag inserted in the optical path. For example, permanent magnets may be used as the flags, and a magnetic sensor then used as the distinguishing sensor.

FIG. 9 shows the physical relationship between the flags 45a, 45b, 45c and the distinguishing sensor 46. The distinguishing sensor 46 has two addresses. The flag is opposite either of the two addresses, a right address and a left address, when one of the cube cassettes is inserted in the optical path.

Next, with regard to the second embodiment, a connection of electric signals and a process will be explained. The distinguishing sensor 46 is connected to a discrimination decision circuit 47. The discrimination decision circuit 47 is connected to a CPU 29, and sends a cube cassette identifying signal to the CPU 29. The cube cassette identifying signal is captured based on the address of the flag opposite the distinguishing sensor 46.

The CPU 29 supplies a moving amount signal and a moving direction signal on the basis of the cube cassette identifying signal sent by the discrimination decision circuit 47 so as to move the parallel prism 43. The CPU 29 sends the moving amount signal and the moving direction signal to an optical path correcting unit driver 48 to move the parallel prism 43.

At this point, the movement of the parallel prism 43 intentionally makes a kind of focal shift of light incident on the imaging sensor 26 corresponding to the focal shift of light incident on the image plane 24. Then the stage 2 is moved so as to correct the kind of focal shift (the automatic focus). As a result, the above movement of the stage 2 also corrects the focal shift of light incident on the image plane 24. Hereinafter, this operation is called "the correction of the focal shift".

The optical path correcting unit driver 48 gives a command to move the parallel prism 43 parallel to directions of the arrows shown in FIG. 7 on the basis of a moving amount signal and a moving direction signal sent by the CPU 29 to carry out "the correction of the focal shift".

Figure 10:
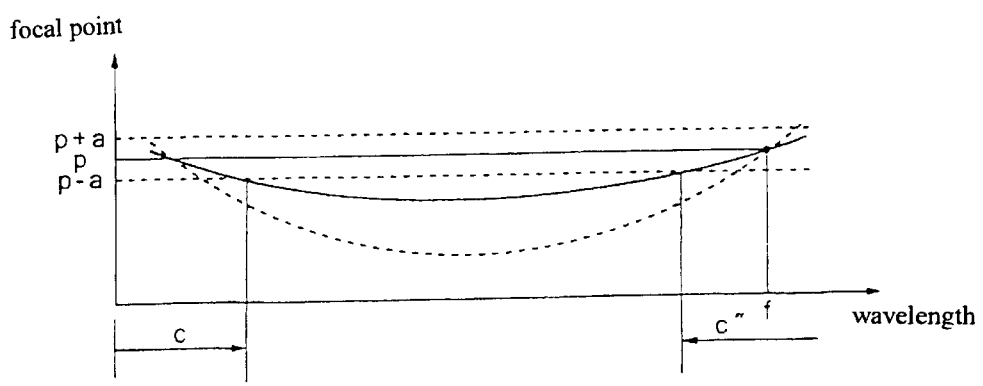
FIG. 10 is a setting graph showing the amount of focal correction, before driving an optical path correction unit, to explain the action and advantage of the second embodiment.
Figure 11:
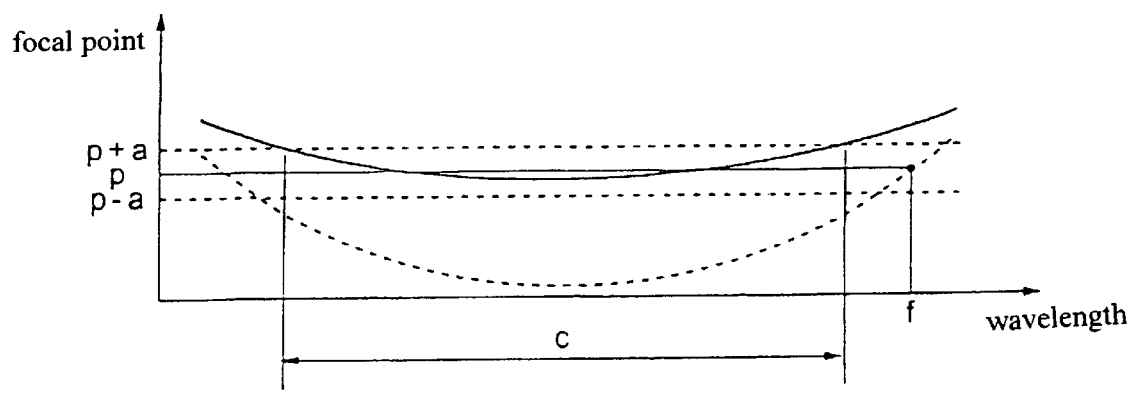
FIG. 11 is a setting graph showing the amount of a focal correction, after driving an optical path correction unit, to explain action and advantage of the second embodiment.

FIGS. 10 and 11 show models to set the amount of focal correction. The longitudinal axis shows the focal point of light incident on the image plane 24 and the imaging sensor 26. The horizontal axis shows the wavelength of light. A solid curved line shows a change of a focal point that depends on a change of a wavelength of light incident on the image plane 24. A broken curved line shows a change of a focal point that depends on a change of a wavelength of light incident to the imaging sensor 26.

The wavelength of light incident on the imaging sensor 26 depends on the spectral transmittance characteristic of the band-pass filter 7'. Under the condition that "f" is a peak of the spectral transmittance characteristic of the band-pass filter 7', a position shown as "p" will be a focal point of light incident on the imaging sensor 26. In addition, under a condition where a value shown as "a" is an allowable value of the focal shift of the imaging sensor 26, corresponding to the image plane 24, on the basis of a focal depth of an observation image captured by the imaging sensor 26, ranges shown as "c" and "c''''" in FIG. 10 will be ranges over which the automatic focus is available.

FIG. 11 shows a graph in which the broken line shown in FIG. 10 is moved in the direction of the longitudinal axis by driving the optical path correction unit 42 to change the length of the optical path. A range shown as "c'" is a range over which the automatic focus is available. Therefore, in this model, a range between "c" and "c''''" is covered as a range where the automatic focus is available by setting the optical path correcting unit 42 in either position shown in FIG. 10 or 11.

That is, in this embodiment, it is possible to correct the length of the optical path corresponding to a wavelength of fluorescence by creatively using the right and left addresses of the distinguishing sensor 46 as positions to set the flag of the cube cassette inserted in the optical path, and by setting the optical path correcting unit 42 in the position shown in FIG. 10 or 11 corresponding to a respective address.

Figure 12:
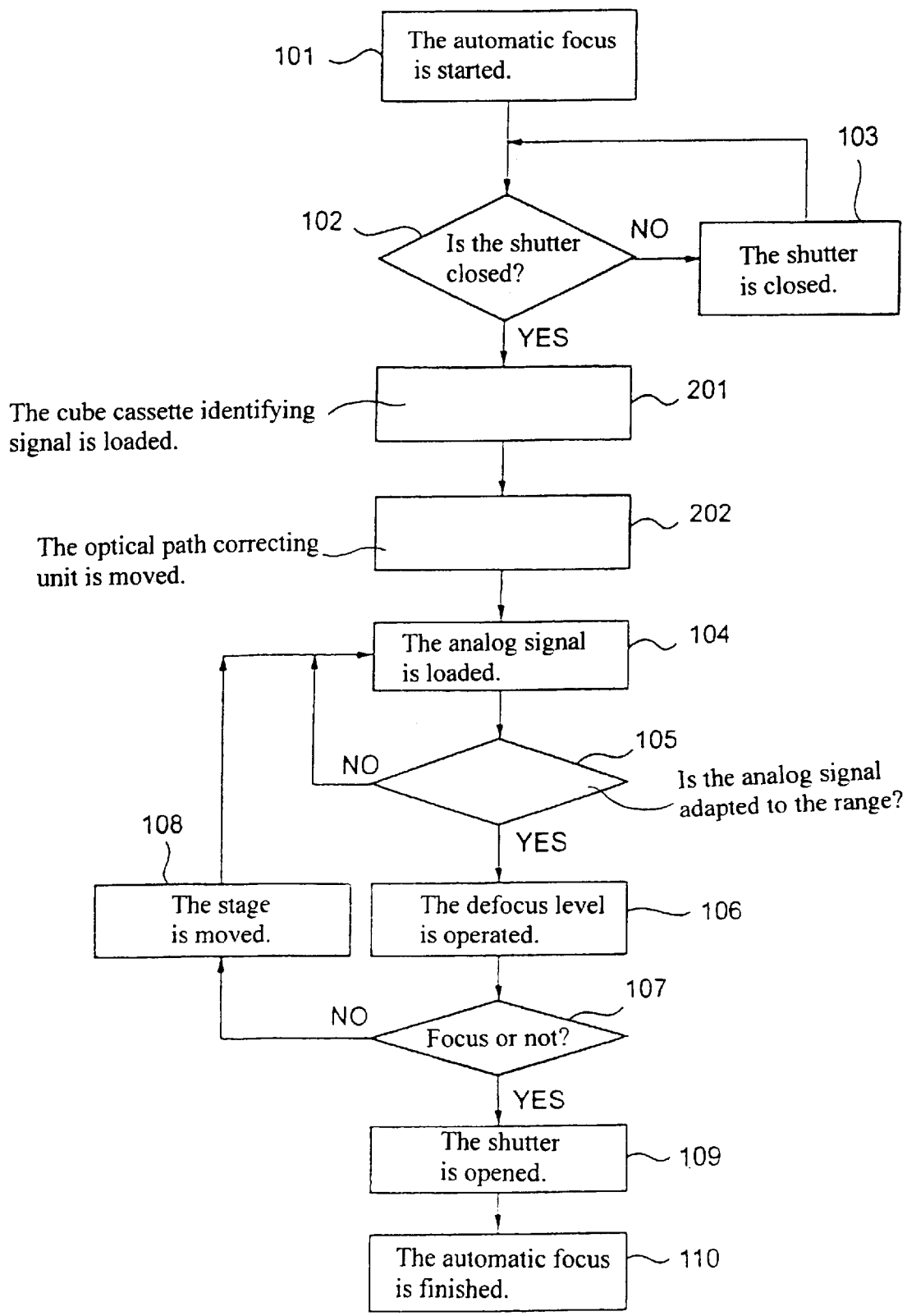
FIG. 12 is a flowchart to explain the operation of the block diagram shown in FIG. 7.

Next, referring to flowchart of FIG. 12, an operation of the second embodiment as structured above is explained. First of all, in step 101, an automatic focus operation is started according to a signal from the outer controller 32, and then, in step 102, an open-close condition of the shutter 16 is checked. In the case where the shutter 16 is opened, in step 103, a signal is transmitted to the shutter driver 31 to close the shutter 16. In the case where the shutter 16 is closed, in step 201, the cube cassette identifying signal based on the address of the flag captured by the distinguishing sensor 46 is loaded in the CPU 29 through the discrimination decision circuit 47. Next, in step 202, the CPU 29 sends to the optical path correcting unit driver 48 the signal including the directions of movement of the parallel prism 43 on the basis of the cube cassette identifying signal so as to drive the parallel prism 43. After driving the parallel prism 43, step 104 is carried out. The following steps in FIG. 12 that are the same as those in FIG. 3 are given the same reference numbers and their description is omitted.

The second embodiment as explained above has the same advantages as those of the first embodiment. Additionally, in the second embodiment, the kind of cube cassette, which is selectively inserted in the optical axis, is distinguished, and then the optical path correcting unit 42 is driven according to the kind of cube cassette. That is, the second embodiment enables correction of the focal shift, which is caused by changing the cube cassette inserted in the axis to another one, of the light incident on the image plane 24 by carrying out "the correction of the focal shift", so that focusing precision of the automatic focus for the image plane 24 is maintained without reference to the wavelength of the observation image.

(A Modification of the Second Illustrative Embodiment)

The second embodiment enables setting the optical path correcting unit 42 in two positions shown in FIG. 10 or 11. In addition, it is obvious that the focusing precision of the automatic focus for the image plane 24 can be improved by subdividing the above two positions into three or more. For example, in the above second embodiment, the distinguishing sensor 46 has two addresses, and either of two addresses is opposite to the flag of the cube cassette when the one of the cube cassettes 41a, 41b, and 41c is inserted into the optical path. At this point, under the condition that there is a new cube cassette which has an extra-flag formed next to the flags already existing, both of them can be distinguished by the two addresses of the distinguishing sensor 46 at once. That is, this modification enables setting the optical path correcting unit 42 in three positions. Under condition that three flags are formed on each of the cube cassettes, three cube cassettes can be used in one apparatus, and this modification enables setting the optical path correcting unit 42 in any of three positions. Furthermore, under the condition that the distinguishing sensor 46 has three addresses, seven cube cassettes can be used in one apparatus.

As explained above, the kind of focal shift of light incident on the imaging sensor 26 is intentionally selected by driving the parallel prism 43 in the second embodiment. Also, the kind of focal shift can be established by moving the imaging sensor 26 or by using a chromatic aberration correcting lens.

Figure 13:
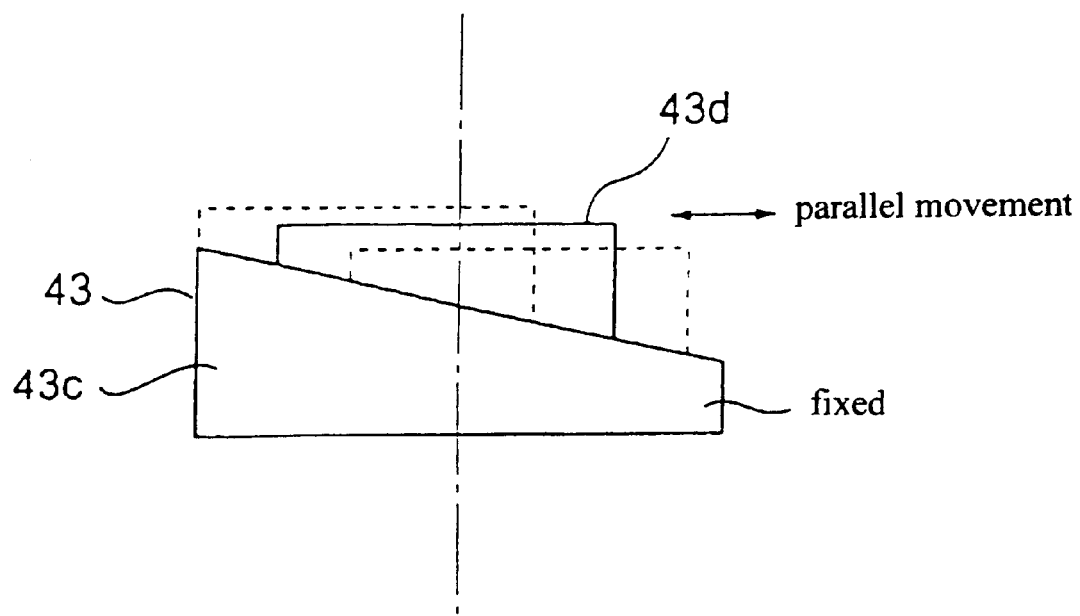
FIGS. 13(a), and (b) are diagrams to explain a modification of the second embodiment.
Figure 13:
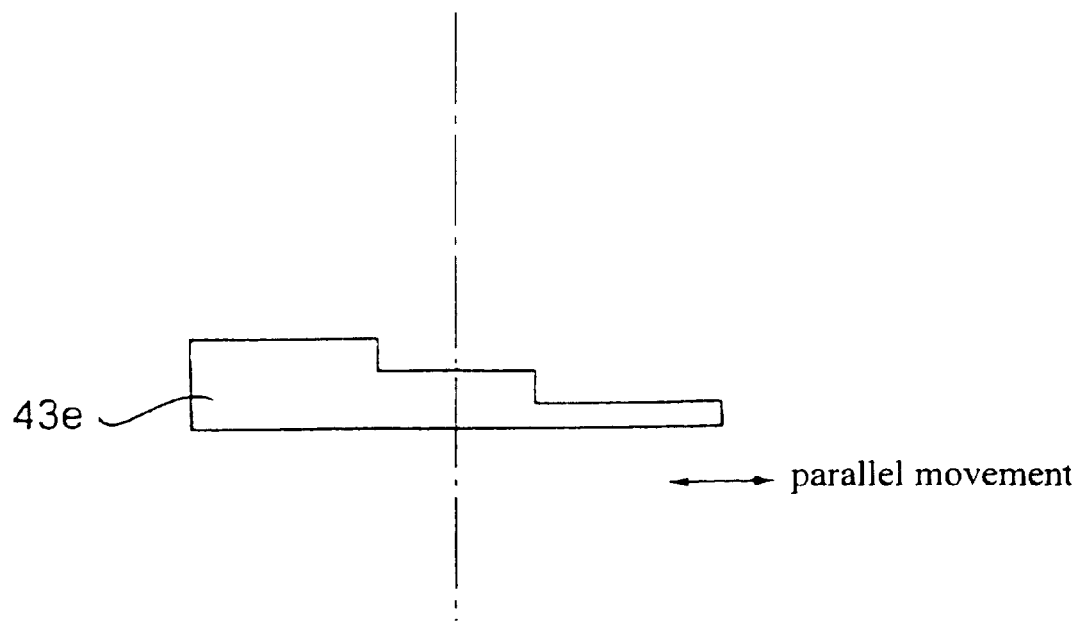

Furthermore, although a correction of the length of the optical path is carried out by driving the parallel prism 43, the parallel prism 43 may possibly make a lateral shift of an image focused on the imaging sensor 26. Therefore, the structures shown in FIGS. 13(a), and (b) will be better to cancel the lateral shift. FIG. 13(a) shows two wedge prisms 43c and 43d having the same refractive index. Inclined faces of these two wedge prisms are put together as shown in FIG. 13. The lower side prism 43c is fixed, and then the upper side prism 43d is movable parallel to the directions of arrows shown in FIG. 13(a). FIG. 13(b) shows a structure to move a stepwise prism 43e parallel to directions of arrows shown in FIG. 13(b). The stepwise prism 43e has a plurality of planes parallel to each other, and each of these planes is at a different height.

Third Illustrative Embodiment

Figure 14:
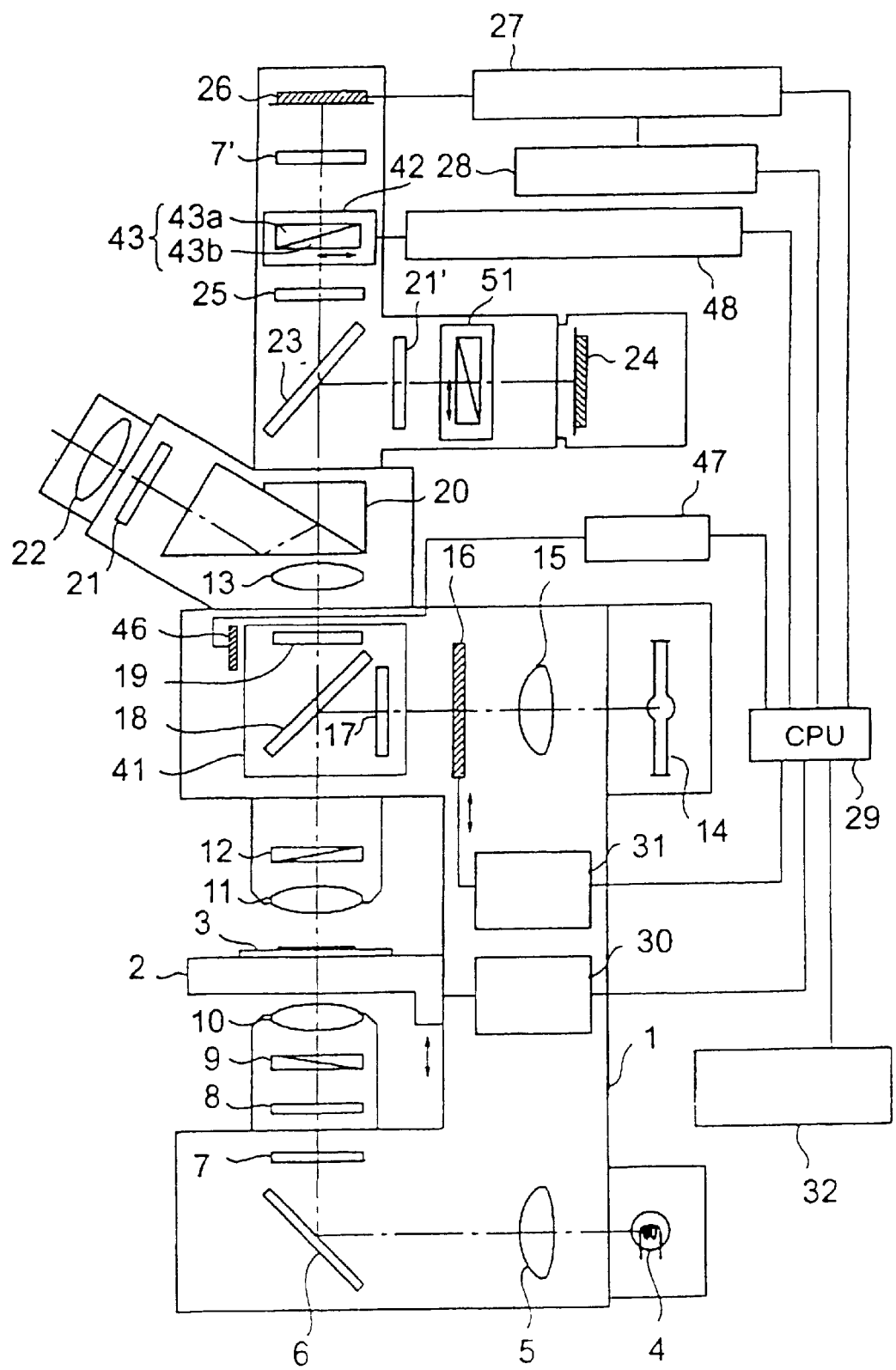
FIG. 14 is a block diagram of the focusing system for the microscope according to a third embodiment of the invention.

FIG. 14 shows a structure of a third embodiment of this invention. The components in FIG. 14 that are the same as those in FIGS. 1 and 7 are given the same reference numbers and their description is omitted. A second optical path correcting unit 51 included the imaging optical system is placed between the dichroic mirror 23 and the image plane 24. The second optical path correcting unit has substantially the same structure as the optical path correcting unit 42. No signal is supplied to the second optical path correcting unit 51. So the second optical path correcting unit 51 is independently moved.

Figure 15:
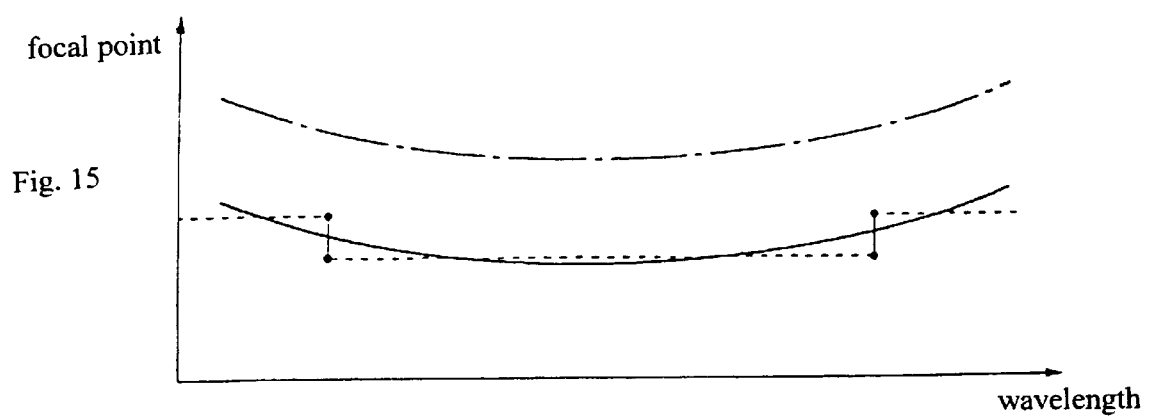
FIG. 15 is a setting graph showing the amount of a focal correction to explain the action and advantage of the third embodiment.

FIG. 15 shows a graph of the resulting shift of a focal point of light incident on the image plane 24 caused by driving the second optical path correcting unit 51, in similar fashion to the graph shown in FIGS. 10, and 11. A solid curved line shows the change of the focal point which depends on a change of a wavelength of the light incident on the image plane 24 before driving the second optical path correcting unit 51. An alternate long and short dash curved line shows the change of the focal point which depends on a change of a wavelength of the light incident on the image plane 24 after driving the second optical path correcting unit 51. A broken line shows the correction result of the position "Up" which is the focal point of light incident on the imaging sensor 26. The position "p" was already explained in connection with FIG. 10. The position "p" is corrected by driving the optical path correcting unit 42 by means of the optical path correcting unit driver 48 with two steps.

That is, there is the difference, a focal shift, between the focal point detected by the automatic focus and the focal point after driving the second optical path correcting unit 51. The difference is shown as the distance between the broken curved line and the alternate long and short dash curved line. As shown in this model, the focal point of the observation image based on light incident on the image plane 24 always has a constant amount offset to the focal point detected by the automatic focus.

Figure 16:
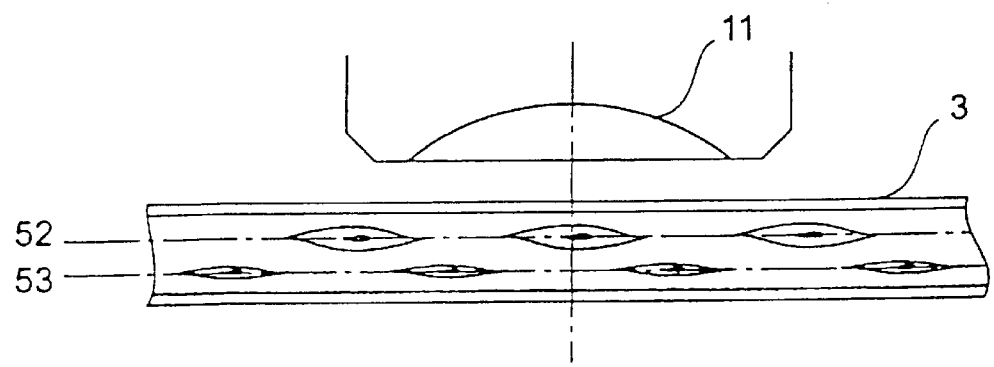
FIG. 16 is a model, of a thick sample is in focus, to explain the action and advantage of the third embodiment.

The third embodiment as explained above has the same advantages as those of the first and second embodiments. Additionally, the third embodiment enables always making a constant offset for the focal point detected by the automatic focus. For example, in case where the sample 3 shown in FIG. 16 is thick in a direction of the optical axis, a part 52 of the sample 3 may be focused on the imaging sensor 26 although a part 53 of the sample 3 is expected to be imaged by the image plane 24. At this point, the second optical path correcting unit 51 is driven by a manual operation to focus an imaging point of the part 53 on the image plane 24, so that it is possible to always image the part 53 by the automatic focus. A focusing system corresponding to requests from users can be supplied.

(A Modification of the third Illustrative Embodiment)

As explained above, the focal point of light incident on the image plane 24 is arranged by driving the second optical path correcting unit 51 in the third embodiment. Also, the focal point of light incident on the image plane 24 can be controlled by moving the image plane 24 or by using a chromatic aberration correcting lens corresponding to each wavelength.

Additionally, in the above third embodiment, the optical path correcting unit 42 is connected to the optical path correcting unit driver 48 connected to the CPU 29. No signal is supplied to the second optical path correcting unit 51, and then the second optical path correcting unit 51 is independently moved.

Figure 17:
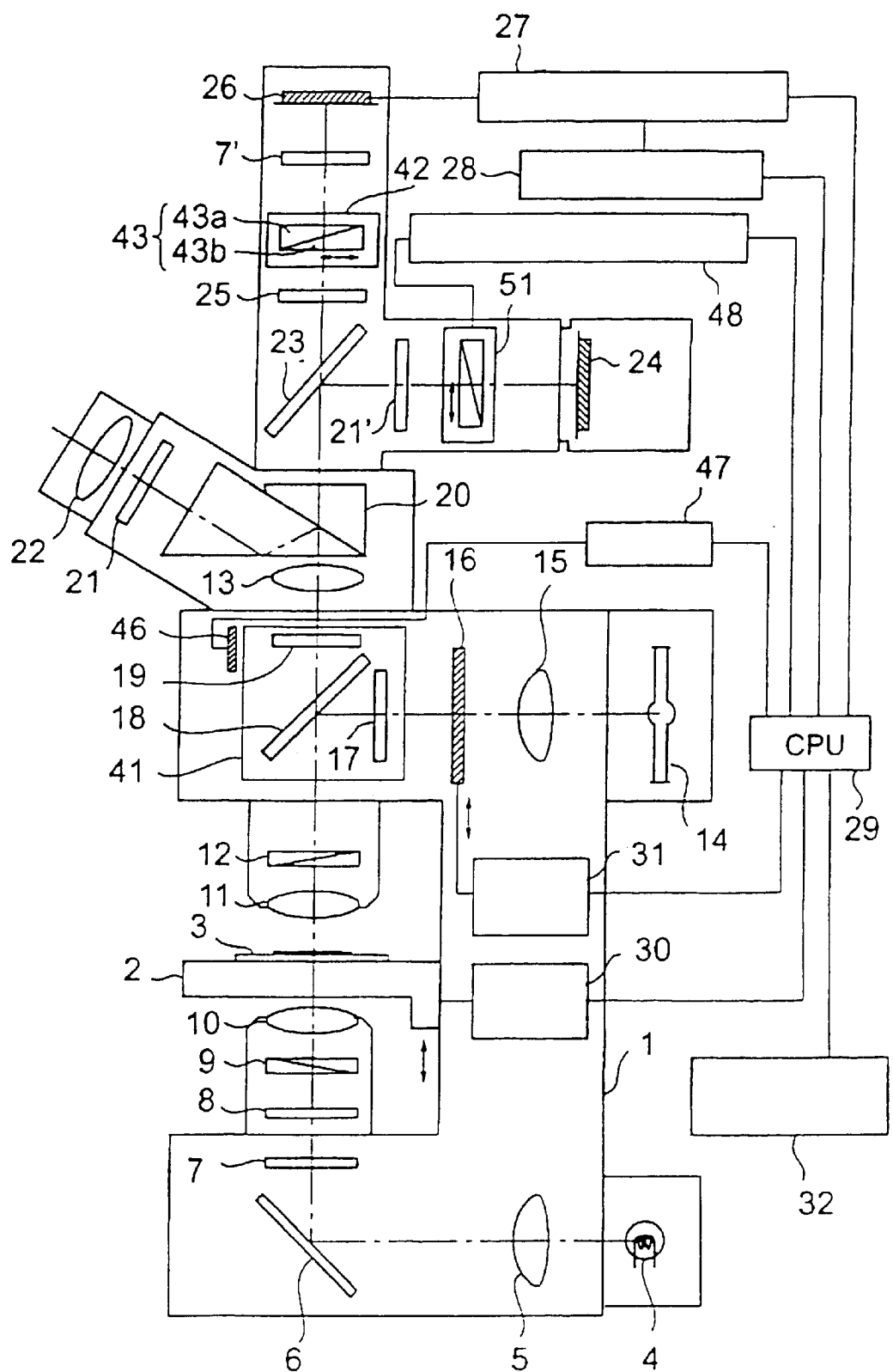
FIG. 17 is a block diagram of the focusing system for the microscope according to a modification of the third embodiment of the invention.

FIG. 17 is a block diagram of the focusing system for the microscope according to a modification of the third embodiment of the invention. The components in FIG. 17 that are the same as those in FIG. 14 are given the same reference numbers and their description is omitted. This modification is different from the third embodiment as shown in FIG. 17. That is, in this modification, the second optical path correcting unit 51 is connected to the optical path correcting unit driver 48 connected to the CPU 29. No signal is supplied to the optical path correcting unit 42, and then the optical path correcting unit 42 is independently moved. This modification, as explained above, has the same advantages as those of the third embodiment.

Figure 18:
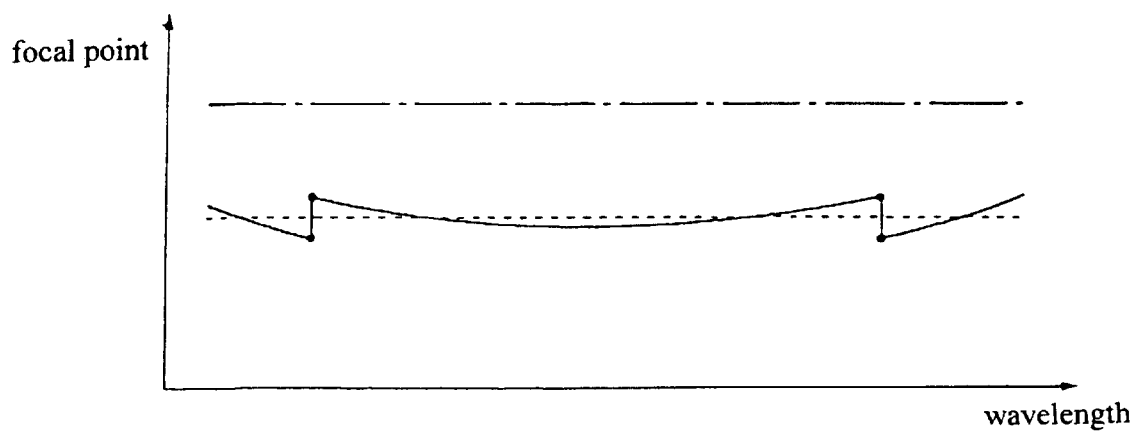
FIG. 18 is a setting graph showing the amount of a focal correction to explain the action and advantage of the modification of the third embodiment.

FIG. 18 shows a graph showing the resulting shift of a focal point of light incident on the imaging sensor 26 by a manual operation to drive the optical path correcting unit 42. A broken line shows the position "p" which is a focal point of light incident on the imaging sensor 26. The position "p" was already explained in connection with FIG. 10. An alternate long and two short dashes line shows the shift result of the position "p" by a manual operation to drive the optical path correcting unit 42. A solid curved line shows a correction result of the focal point corresponding to a wavelength of the light incident on the image plane 24. The focal point is corrected by driving the second optical path correcting unit 51 by means of the optical path correcting unit driver 48 with two steps. Also, we can see, as shown in this model, the focal point of the observation image based on light incident on the image plane 24 always has a constant amount of an offset for the focal point detected by the automatic focus.

Fourth Illustrative Embodiment

Figure 19:
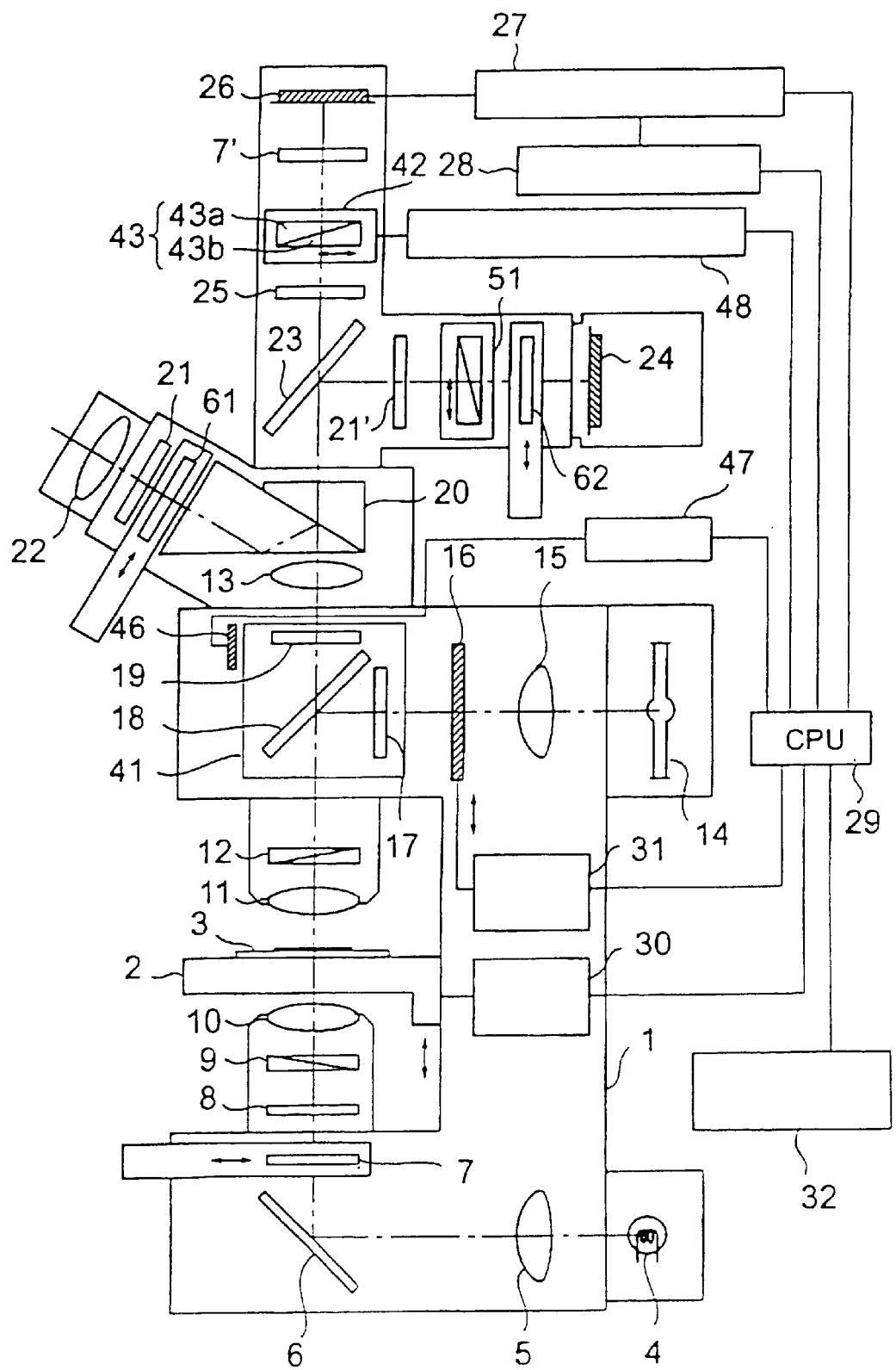
FIG. 19 is a block diagram of the focusing system for the microscope according to a fourth embodiment of the invention.

FIG. 19 shows the structure of a fourth embodiment of this invention. The components in FIG. 19 that are the same as those in FIG. 1, 7, and 14 are given the same reference numbers and their description is omitted. An analyzer 61 is operatively placed in an observation optical path between the optical path dividing prism 20 and the ocular lens 22. An analyzer 62 is operatively placed in an imaging optical path between the second dichroic mirror 23 and the image plane 24.

The analyzer 61 is removable from the observation optical path. The analyzer 62 is removable from the imaging optical path. The band-pass filter 7 is operatively set in the transmitted light path. The band-pass filter 7 can be removed from the transmitted light path.

Regarding the above structure, in the case where the band-pass filter 7 is removed from the transmitted light path, a short-wavelength of observation light transmitted through the analyzer 61 is directed to the ocular lens 22 through the low-pass filter 21, and then the short-wavelength of observation light transmitted through the low-pass filters 21' is directed to the image plane 24 through the analyzer 62. As a result, the short-wavelength of observation light is imaged on the image plane 24, and observed through the ocular lens 22 as a composite image (a transmitted differential interference image and a fluorescence image), that is, the transmitted differential interference image and the fluorescence image are imaged and observed at once. In case where fluorescence is separately observed through the ocular lens 22 and imaged by the image plane 24, the band-pass filter 7 is inserted into the transmitted light path, and then the analyzers 61 and 62 are removed from the observation optical path and the imaging optical path. In the mean time, the band-pass filter 7' is inserted in a focus detecting optical path, so that the condition of an incident wavelength of light, the amount of incident light and so on is not changed. That is, the condition of the automatic focus is not changed.

Following is an advantage of the fourth embodiment. Each of the band-pass filter 7, analyzers 61, and 62 is independently inserted into, and removed from the optical path or the light path as the case may be. Therefore, the fourth embodiment enables choosing an observation style from the fluorescence observation, and the fluorescence and the transmitted differential interference observation at once without changing the condition of the automatic focus.

(A Modification of the Fourth Illustrative Embodiment)

In this modification, the analyzers 61, and 62 are exchanged for an analyzer placed in the optical path between the second Wollaston prism 12 and the optical path dividing prism 20, and the analyzer 25 is removable from the focus detecting optical path. This modification can provide the same advantage as the above fourth embodiment.

In addition, the inserting and removing operation of the optical elements, the band-pass filter 7, analyzers 61, and 62, in the above fourth embodiment can be controlled with batch processing by using electric signals.

In each of the embodiments explained above, transmitted differential interference microscopy is described as an example of microscopy using a transmitted illumination optical system to capture a transmitted optical image. In addition, phase contrast microscopy using the transmitted illumination optical system is available in each of the embodiments explained above. Both transmitted differential interference microscopy and phase contrast microscopy make a contrast with an image of an optical transparent object (phase object), so that phase information of the optical transparent object is captured. The focus operation can be carried out on the basis of the phase information.

Accordingly, various modifications may be made without departing from the spirit or scope of the general inventive concept as defined by the appended claims and their equivalents.

What is claimed is:

1. A reflected illumination fluorescence microscope comprising:
    an objective lens;
    a sample stage;
    a reflected illumination system for irradiating excitation light on a sample via said objective lens to excite the sample, said reflected illumination system having a reflected illumination light source, a first collector lens for collecting light from said reflected illumination light source, a shutter for selectively intercepting light from said reflected illumination light source, an excitation filter for extracting a specified excitation wavelength of light, and a first dichroic mirror for directing excitation light to an axis of said objective lens and transmitting a wavelength of fluorescence emitted from the sample and a wavelength region of light longer than said wavelength of fluorescence;
    an absorption filter disposed in an optical path through which light transmitted through said first dichroic mirror passes;
    an image plane for capturing a fluorescence image;
    a transmitted illumination system for illuminating the sample by using said wavelength region of light longer than said wavelength of fluorescence, said transmitted illumination system having a transmitted illumination light source disposed on the opposite side of said objective lens, a second collector lens for collecting light emitted from said transmitted illumination light source, a first band-pass filter for extracting said wavelength region of light longer than said wavelength of fluorescence, and a condenser lens;
    a second dichroic mirror disposed in an optical path through which light transmitted through said absorption filter passes, said second dichroic mirror reflecting and directing to said image plane light including said wavelength of fluorescence and excluding said wavelength region of light longer than said wavelength of fluorescence;
    a transmitted differential interference optical system having a polarizer and a differential interference prism disposed between said first band-pass filter and said condenser lens, having a second differential interference prism disposed between said objective lens and said first dichroic mirror, and having a first analyzer and an imaging sensor disposed in an optical path through which light transmitted through said second dichroic mirror passes;
    a focus detecting section for detecting a focusing level of a sample image by operating on an evaluation value of said focusing level on the basis of a signal output from said imaging sensor;
    a focusing driver for moving at least one of said objective lens and said sample stage to focus on the sample on the basis of said focusing level;
    a shutter driver for opening and closing said shutter;
    a controller for controlling said imaging sensor, said focus detecting section, said shutter driver, and said focusing driver, said controller carrying out an automatic focus under condition that said shutter is closed;
    an image forming lens disposed in an optical path through which light transmitted through said absorption filter passes;
    an optical path dividing element disposed in an optical path through which light transmitted through said image forming lens passes;
    an ocular lens disposed in an optical path divided by said optical path dividing element;
    a first low-pass filter disposed in front of said ocular lens, said first low-pass filter transmitting said wavelength of fluorescence and stopping said wavelength region of light longer than said wavelength of fluorescence;
    a second analyzer operatively disposed between said second dichroic mirror and said image plane, said second analyzer being removable from an optical path between said second dichroic mirror and said image plane; and a third analyzer operatively disposed between said optical path dividing element and said ocular lens, said third analyzer being removable from an optical path between said optical path dividing element and said ocular lens;

wherein said first band-pass filter is removable from an optical path of said transmitted illumination system, and a transmitted differential interference image and said fluorescence image are imaged and observed at once, under a condition that said first band-pass filter is removed from said transmitted illumination system, said second analyzer is inserted in said optical path between said second dichroic mirror and said image plane, and said third analyzer is inserted in said optical path between said optical path dividing element and said ocular lens.

2. The reflected illumination fluorescence microscope according to claim 1, further comprising:

a second low-pass filter disposed in front of said image plane, said second low-pass filter transmitting said wavelength of fluorescence and stopping said wavelength region of light longer than said wavelength of fluorescence;

a second band-pass filter for extracting said wavelength region of light longer than said wavelength of fluorescence said second band-pass filter disposed in front of said imaging sensor.

3. A reflected illumination fluorescence microscope comprising:

an objective lens;

a sample stage;

a reflected illumination system for irradiating excitation light on a sample via said objective lens to excite the sample, said reflected illumination system having a reflected illumination light source, a first collector lens for collecting light from said reflected illumination light source, a shutter for selectively intercepting light from said reflected illumination light source, an excitation filter for extracting a specified excitation wavelength of light, and a first dichroic mirror for directing excitation light to an axis of said objective lens and transmitting a wavelength of fluorescence emitted from the sample and a wavelength region of light longer than said wavelength of fluorescence;

an absorption filter disposed in an optical path through which light transmitted through said first dichroic mirror passes;

an image plane for capturing a fluorescence image;

a transmitted illumination system for illuminating the sample by using said wavelength region of light longer than said wavelength of fluorescence, said transmitted illumination system having a transmitted illumination light source disposed on the opposite side of said objective lens, a second collector lens for collecting light emitted from said transmitted illumination light source, a first band-pass filter for extracting said wavelength region of light longer than said wavelength of fluorescence, and a condenser lens;

a second dichroic mirror disposed in an optical path through which light transmitted through said absorption filter passes, said second dichroic mirror reflecting and directing to said image plane light including said wavelength of fluorescence and excluding said wavelength region of light longer than said wavelength of fluorescence;

a transmitted differential interference optical system having a polarizer and a differential interference prism disposed between said first band-pass filter and said condenser lens, having a second differential interference prism disposed between said objective lens and said first dichroic mirror, and having an analyzer and an imaging sensor disposed in an optical path through which light transmitted through said second dichroic mirror passes;

a focus detecting section for detecting a focusing level of a sample image by operating on an evaluation value of said focusing level on the basis of a signal output from said imaging sensor;

a focusing driver for moving at least one of said objective lens and said sample stare to focus on the sample on the basis of said focusing level;

a shutter driver for opening and closing said shutter;

a controller for controlling said imaging sensor, said focus detecting section, said shutter driver, and said focusing driver, said controller carrying out an automatic focus under condition that said shutter is closed, a plurality of optical units, each of said optical units including said excitation filter, said first dichroic mirror, and said absorption filter, each being a unit kind, a changer for inserting one of said optical units into an optical path, through which fluorescence transmitted through said objective lens passes, corresponding to said wavelength of fluorescence;

a sensor for detecting said unit kind inserted in said optical path through which fluorescence transmitted through said objective lens passes; and a first optical path correcting unit disposed in an optical path between said second dichroic mirror and said imaging sensor, said first optical path correcting unit changing the length of said optical path, in which said first optical path correcting unit is disposed, corresponding to a command from said controller;

wherein said controller gives a command to said first optical path correcting unit to make a focal shift of light incident on said imaging sensor on the basis of said unit kind, and said focal shift of light incident on said imaging sensor corresponds to a focal shift, which is caused by changing one of said unit kinds to another unit kind, of light incident on said image plane.

4. The reflected illumination fluorescence microscope according to claim 3, wherein said first optical path correcting unit has a pair of wedge prisms.

5. The reflected illumination fluorescence microscope according to claim 3, wherein said first optical path correcting unit has a stepwise prism.

6. The reflected illumination fluorescence microscope according to claim 3, wherein each of said optical units is a kind of cube cassette, said changer is a slider, which has a plurality of said kinds of cube cassettes thereon, and said sensor detects the cube cassette kind.

7. The reflected illumination fluorescence microscope according to claim 3, further comprising:

a second optical path correcting unit disposed in an optical path between said second dichroic mirror and said image plane, said second optical path correcting unit changing the length of said optical path in which said second optical path correcting unit is disposed.

* * * * *